July 6, 1965 D. P. TRILLER 3,193,408

METHOD FOR PRODUCING INTEGRATED CIRCUITRY COMPONENTS

Filed Aug. 22, 1961 2 Sheets-Sheet 1

INVENTOR.
David P. Triller,
BY
W. H. Loesch
Paul S. Collignon
Attorneys.

METHOD FOR PRODUCING INTEGRATED CIRCUITRY COMPONENTS

Filed Aug. 22, 1961 2 Sheets-Sheet 2

INVENTOR.
David P. Triller,
BY
H. H. Losche
Paul S. Collignon
Attorneys.

3,193,408
METHOD FOR PRODUCING INTEGRATED CIRCUITRY COMPONENTS

David P. Triller, Indianapolis, Ind., assignor to the United States of America as represented by the Secretary of the Navy Filed Aug. 22, 1961, Ser. No. 133,276
1 Claim. (Cl. 117—212)
(Granted under Title 35, U.S. Code (1952), sec. 266)

The invention described herein may be manufactured and used by or for the Government of the United States of America for governmental purposes without the payment of any royalties thereon or therefor.

The present invention relates to a device and method of producing integrated circuitry components by the deposition of thin films through movable masks onto insulated substrates, such as glass, fused silica, or ceramic substrates.

There is a constant demand for smaller electrical and electronic components, particularly in the aircraft and missile fields, as weight is of extreme importance. One concept of microelectronics which is being presently investigated and which offers a great reduction in size and weight of electronic units is that of integrated circuitry which is formed on insulated bases such as glass, fused silica, or ceramic substrates. Integrated circuitry includes a number of active and passive components which are fabricated by one or more of a combination of several thin film deposition techniques onto a glass or ceramic substrate.

Heretofore, a special mask, or series of masks, was made for each different pattern that was deposited on substrates. The use of a special mask adds appreciably to the cost of the substrates, particularly when only a few units are being produced for research and development purposes.

The present invention contemplates a plurality of shields that are slidable relative to the substrate having film deposited thereon. The shields may be programmed, as by the use of punched cards, to automatically provide for the desired patterns on the substrate. The advantage of the present invention resides in the fact that an integrated circuitry pattern can be provided on a substrate without first having to make a masking layout and a mask.

It is therefore a general object of the present invention to provide both an improved device and an improved method for producing integrated circuitry on substrates.

Another object of the present invention is to provide an improved masking device for use in depositing thin films on substrates.

Other objects and advantages of the present invention will be readily appreciated as the same becomes better understood by reference to the following detailed description when considered in connection with the accompanying drawings wherein.

Figure 1:
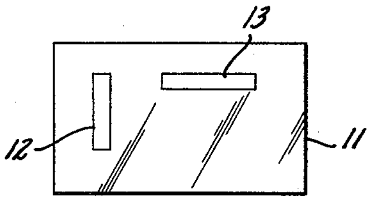
FIGURE 1 is a plan view showing components on a substrate.
Figure 2:
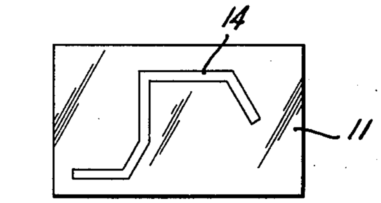
FIGURE 2 is a plan view showing a conductor on a substrate.

Referring now to the drawings, there is shown in FIGURE 1 a substrate 11 having a resistor 12 and a capacitor 13 deposited thereon. In FIGURE 2 of the drawings, there is shown a conductor pattern 14 on a substrate. The substrate can be of any suitable material, such as glass, alumina, beryllia, or barium titanate. The present state of the art of thin-film microcircuitry fabrication permits the deposition of resistors, capacitors, small inductances, and connectors. Thin solid films can be deposited onto substrates by various methods such as electrodeposition, chemical precipitation, thermal decomposition, cathodic sputtering, and high vacuum evaporation. The depositing of films by high vacuum evaporation has been particularly successful as the process is easily controlled, and the deposited films have a high degree of purity.

The capacitance of a thin-film condenser is a function of the areas of the capacitor electrodes. The resistance of a thin-film resistor is a function of the resistor length and width. The interconnection of microcircuit components requires the deposition of conducting materials on accurately located areas of the substrate. It can thus be seen that the successful production of passive thin-film microcircuitry is largely dependent upon the ability to deposit desired materials at accurately defined areas on a substrate.

Figure 3:
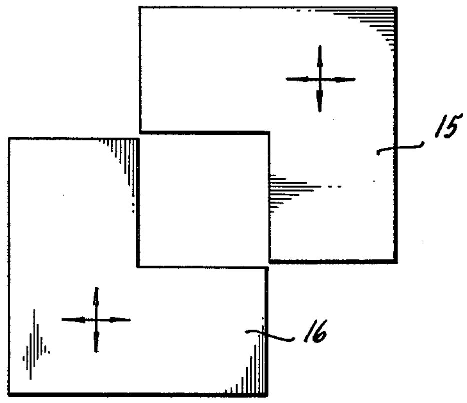
FIGURE 3 is a plan view showing one pair of slidable masks.
Figure 4:
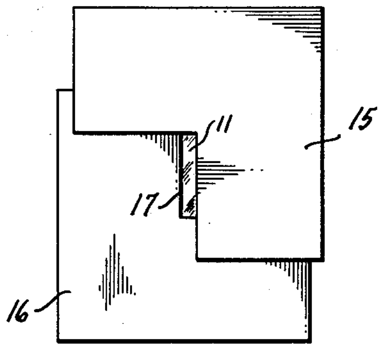
FIGURE 4 is a plan view showing a pair of masks covering a portion of a substrate.

Referring now to FIGURES 3 and 4 of the drawings, there is shown a pair of L-shaped masks 15 and 16 that are slidably mounted by any suitable means so that each mask can be moved in two mutually perpendicular directions. As shown in FIGURE 4 of the drawings, mask 15 can travel over mask 16, and thus any desired opening 17 can be formed by the two masks. This arrangement permits the material being evaporated to be deposited onto the substrate 11 at the desired location and at the desired shape.

Figure 5:
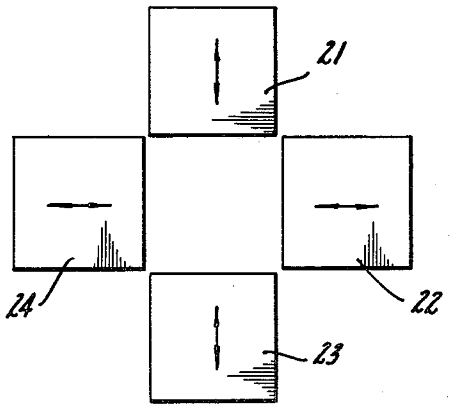
FIGURE 5 is a plan view of another embodiment of masks.
Figure 6:
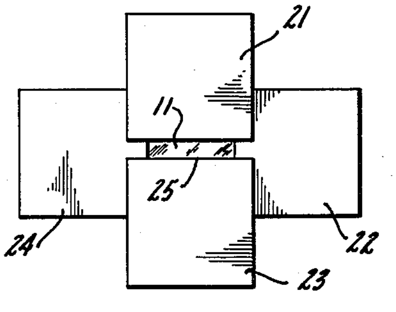
FIGURE 6 is a plan view showing a plurality of masks covering a portion of a substrate.

Referring now to FIGURES 5 and 6 of the drawings, a second embodiment is shown having four slides 21 through 24. Each slide is movable in one direction and, as shown in FIGURE 6 of the drawings, the slides can be arranged to provide an opening 25 of the desired size and at the desired location on the substrate 11.

Figure 7:
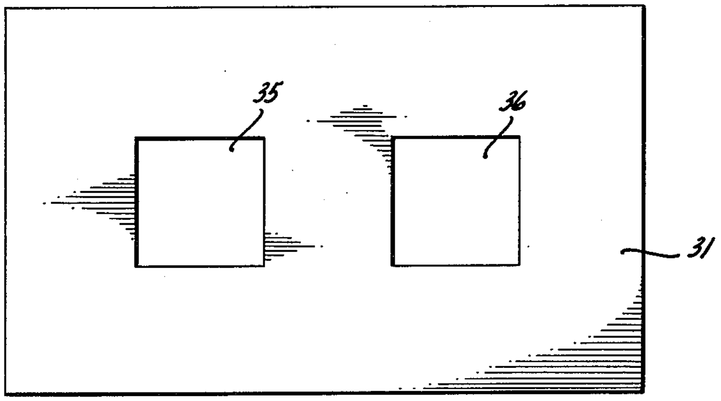
FIGURE 7 is a plan view showing a third embodiment of a set of masks.
Figure 8:
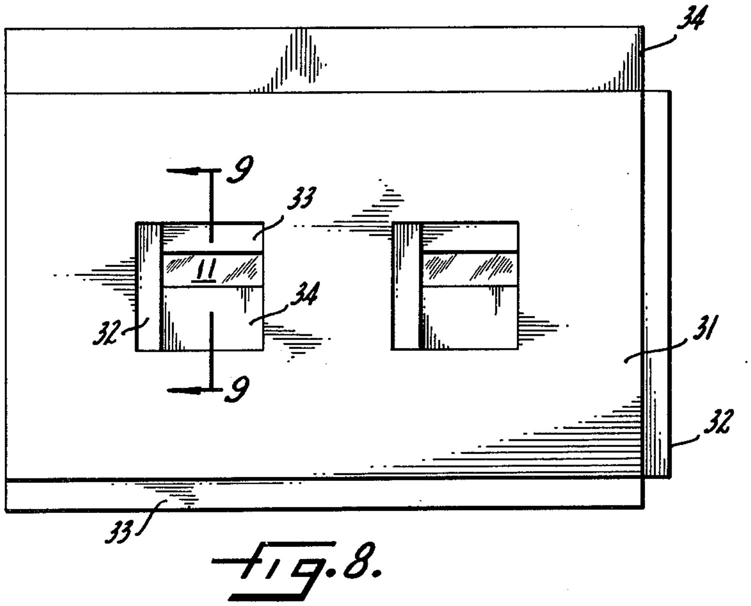
FIGURE 8 is a plan view showing the set of masks of FIGURE 7 covering a portion of a substrate.
Figure 9:
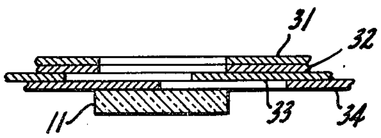
FIGURE 9 is a sectional view taken on line 9—9 of FIGURE 8.

Another embodiment of the present invention is shown in FIGURES 7, 8, and 9, which show four slides 31 through 34 having a pair of openings 35 and 36. This arrangement permits the deposition of film on two separate substrates at the same time. Obviously, any number of openings could be provided, two being shown for purposes of illustration only, and this embodiment can be used for large production runs. As shown in FIGURES 8 and 9, masks 31 and 32 are movable in the same direction, and define the size of the opening in one direction, while masks 33 and 34 are movable in the same direction to define the size of the opening in the second direction.

In operation, the masks can be mechanized by any suitable means, such as slides and gear trains, and can be positioned automatically, as by punched cards or a tape. For example, in making the unit shown in FIGURE 1 of the drawings, the slides can be positioned first to form an opening for the resistor 12 and then after the resistor film is deposited, the slides can be moved to form an opening for the capacitor 13. If a continuous pattern is desired, such as that shown in FIGURE 2 of the drawings, the masks can be moved continuously, as by a servo system, and the film can be deposited as the masks are traveling at a given constant speed.

It can thus be seen that the present invention provides an improved method of depositing films on substrates, as many different configurations can be made without requiring that a special mask be made.

Obviously many modifications and variations of the present invention are possible in the light of the above teachings. It is therefore to be understood, that within the scope of the appended claim, the invention may be practiced otherwise than as specifically described.

What is claimed is:

A method of producing integrated circuitry on a substrate comprising:

first stationarily mounting a substrate, then positioning at least two relatively movable masks over said substrate, the edges of said at least two relatively movable masks forming a fixed aperture above said substrate, then randomly moving said fixed aperture formed by said movable masks while maintaining said fixed aperture above said substrate, said fixed aperture moving in a predetermined pattern relatively to said stationarily mounted substrate, and simultaneously depositing a quantity of evaporated material through said fixed aperture during movement of said aperture relative to said substrate whereby a continuous pattern of evaporated material can be deposited onto said substrate.

References Cited by the Examiner

UNITED STATES PATENTS

| | | | |
|---|---|---|---|
| 1,584,914 | 5/26 | Yaffee | 117—38 |
| 1,605,670 | 11/26 | Lee | 118—505 |
| 1,988,065 | 1/35 | Wooddel | 117—38 X |
| 2,160,981 | 6/39 | O'Brien | 117—107 |
| 2,559,351 | 7/51 | Drake et al. | 117—38 |
| 2,740,928 | 4/56 | Ward | 117—107 |

FOREIGN PATENTS

| | | |
|---|---|---|
| 747,257 | 9/44 | Germany. |

RICHARD D. NEVIUS, *Primary Examiner.*